(12) United States Patent
Delaney et al.

(10) Patent No.: US 10,114,616 B2
(45) Date of Patent: Oct. 30, 2018

(54) DISCOVERY FOR PATTERN UTILIZATION FOR APPLICATION TRANSFORMATION AND MIGRATION INTO THE CLOUD PATTERN

(71) Applicant: International Business Machines Corporation, Armonk, NY (US)

(72) Inventors: John V. Delaney, Kildalkey (IE); Florian D. Graf, Zurich (CH); Maeve M. O'Reilly, Rathdrum (IE); Ruediger Schulze, Boeblingen (DE); Thomas Spatzier, Holzgerlingen (DE); Clea A. Zolotow, Key West, FL (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 15/228,079

(22) Filed: Aug. 4, 2016

(65) Prior Publication Data
US 2018/0039487 A1 Feb. 8, 2018

(51) Int. Cl.
G06F 9/44 (2018.01)
G06F 8/30 (2018.01)

(52) U.S. Cl.
CPC ..................... G06F 8/30 (2013.01)

(58) Field of Classification Search
CPC ................. G06F 8/35; G06F 8/10; G06F 8/20
See application file for complete search history.

(56) References Cited

U.S. PATENT DOCUMENTS

| 8,869,136 | B2 | 10/2014 | Chapman et al. |
| 8,949,654 | B2 | 2/2015 | Hasit |
| 8,978,113 | B2 | 3/2015 | Vanderveen et al. |
| 9,054,952 | B2 | 6/2015 | Rothstein et al. |
| 9,075,811 | B2 | 7/2015 | Nayyar et al. |
| 2012/0167184 | A1* | 6/2012 | Vanderveen ...... H04L 29/12028 726/5 |
| 2013/0085989 | A1* | 4/2013 | Nayyar ............. G06F 17/30079 707/610 |
| 2014/0109037 | A1* | 4/2014 | Ouali ........................ G06F 8/10 717/105 |
| 2014/0130036 | A1* | 5/2014 | Gurikar ..................... G06F 8/61 717/176 |
| 2014/0282404 | A1 | 9/2014 | Gonsalves |

(Continued)

FOREIGN PATENT DOCUMENTS

| CN | 103873534 | 6/2014 |
| EP | 1642197 | 3/2015 |
| WO | 2015065355 | 5/2015 |

OTHER PUBLICATIONS

"Migrating Applications to Public Cloud Services: Roadmap for Success," Cloud Standards Customer Council, 2013, 28 pages.

*Primary Examiner* — Chameli Das
(74) *Attorney, Agent, or Firm* — VanLeeuwen & VanLeeuwen; David B. Woycechowski (57) ABSTRACT

An approach is provided in which an information handling system receives a set of discovery results that correspond to source applications executing in source environments. The information handling system then maps the set of discovery results to a target pattern that includes descriptions of components corresponding to the discovery results. In turn, the information handling system creates a target application based, at least in part, on the target pattern.

17 Claims, 8 Drawing Sheets

(56) References Cited

U.S. PATENT DOCUMENTS

| | | | |
|---|---|---|---|
| 2014/0317640 A1* | 10/2014 | Harm | G06F 9/4843 |
| | | | 719/320 |
| 2014/0359128 A1 | 12/2014 | Bhattacharya et al. | |
| 2014/0380192 A1 | 12/2014 | Shukla | |
| 2015/0026621 A1 | 1/2015 | CaraDonna et al. | |
| 2015/0248504 A1* | 9/2015 | Glunz | B33Y 50/00 |
| | | | 700/98 |
| 2015/0347541 A1* | 12/2015 | Holmes | G06F 17/30563 |
| | | | 707/602 |
| 2016/0019102 A1 | 1/2016 | Cui et al. | |
| 2016/0094477 A1 | 3/2016 | Bai et al. | |
| 2018/0075107 A1* | 3/2018 | Park | G06F 17/30516 |

* cited by examiner

DISCOVERY FOR PATTERN UTILIZATION FOR APPLICATION TRANSFORMATION AND MIGRATION INTO THE CLOUD PATTERN

BACKGROUND

Today's information technology (IT) environments are becoming increasingly complex and typically require IT managers to concentrate their efforts on maintaining existing applications and existing infrastructures. However, situations arise that require migrating existing servers and software to new IT environments, such as for enhanced services, lower costs, mergers, acquisitions, or other business or technology purposes. The migration process involves migrating physical components, virtual components, application logic, application data, network affinities, etc. from the existing IT environments to the new IT environments.

Industry standard "patterns" encompass proven practices and knowledge that are captured, lab tested, and optimized into repeatable and deployable forms. The patterns typically include declarative descriptions corresponding to different IT areas such as installation, configuration, optimization, and management of systems. Each pattern describes an application's environment in a logical way, such as its components, configurations, relationships, and points of variability.

BRIEF SUMMARY

According to one embodiment of the present disclosure, an approach is provided in which an information handling system receives a set of discovery results that correspond to source applications executing in source environments. The information handling system then maps the set of discovery results to a target pattern that includes descriptions of components corresponding to the discovery results. In turn, the information handling system creates a target application based, at least in part, on the target pattern.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
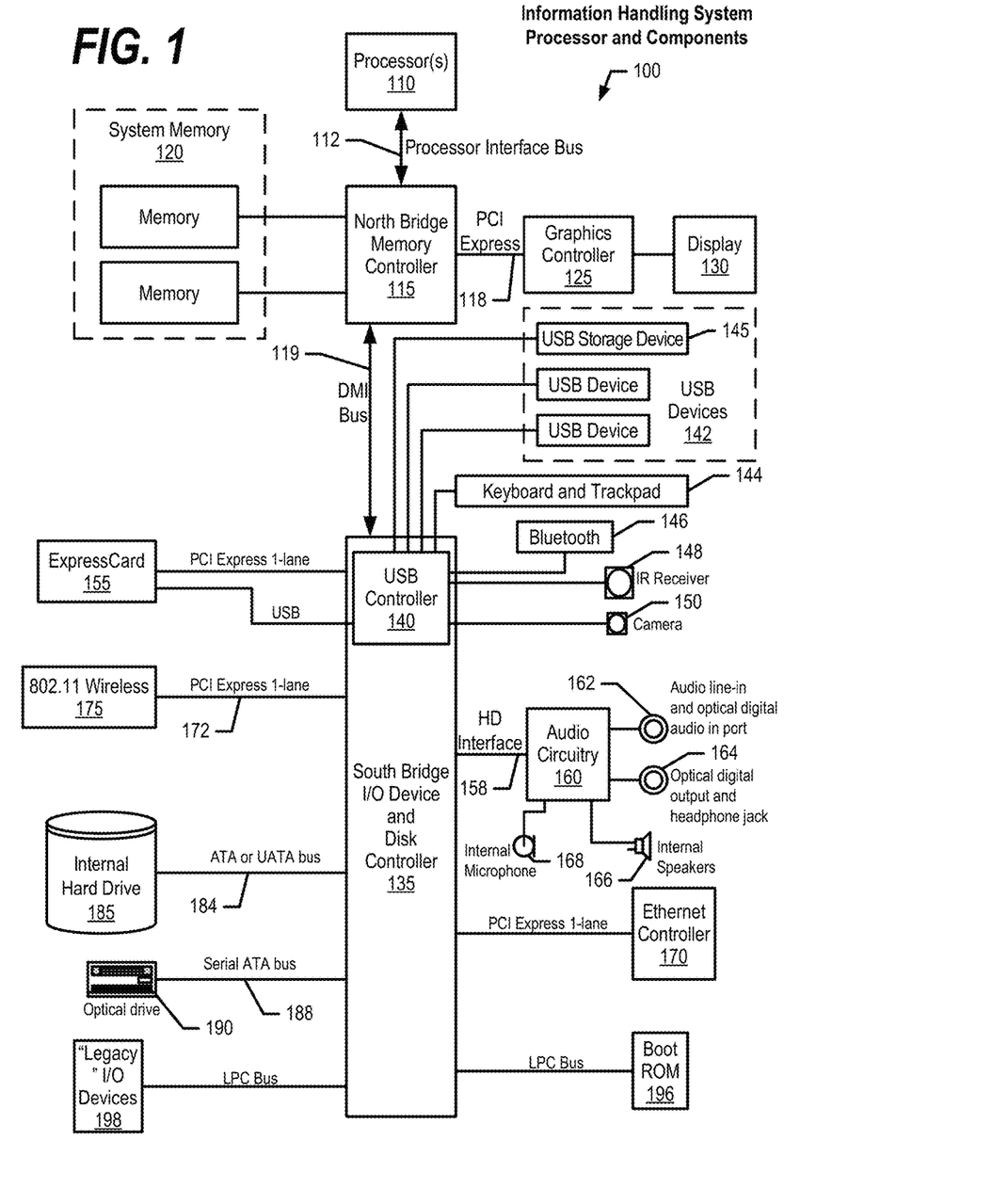
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge.

Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
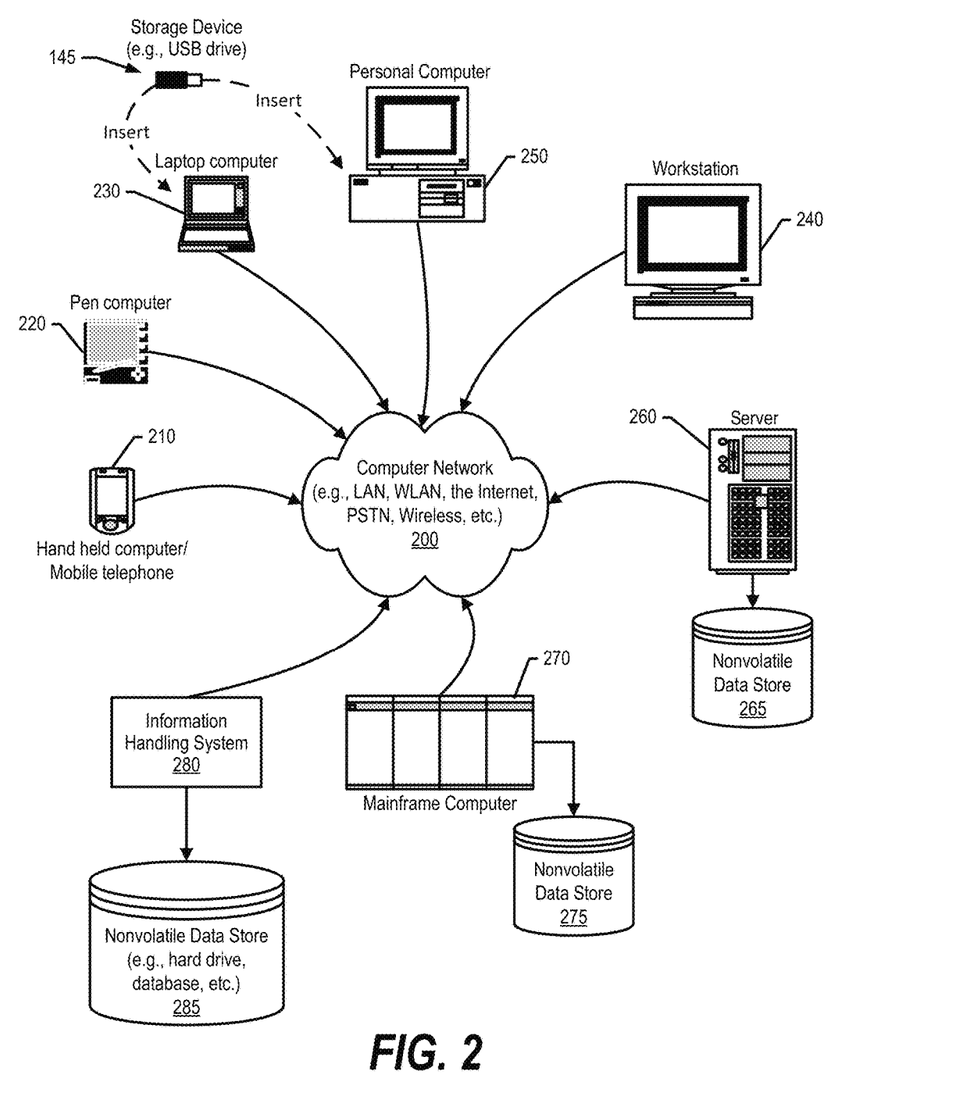
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-7 depict an approach that can be executed on an information handling system to migrate applications from a source environment to a target environment using industry standard patterns. As discussed previously, today's IT environments are becoming more complex and typically require IT managers concentrate their efforts on maintaining existing applications and their supporting underlying infrastructure. As a result, little time is available for migrating applications from their source environment to different computer environments such as cloud-based environments. Prior to this disclosure, the migration process may require numerous IT man-hours and an extended length of system downtime to complete the migration process, especially if the target environment is a cloud-based environment.

This disclosure describes an approach taken by the information handling system to discover source application landscapes and affinities within a source environment; map the source application landscapes and affinities to industry standard patterns; integrate source application logic with the mapped industry standard patterns to create target applications; provision the target applications onto target environments; and migrate source content to the provisioned target applications.

The information handling system provides an automated capability to match the discovered application landscapes and affinities to a catalog of industry-wide standard patterns.

In one embodiment, the patterns are provided by multiple cloud providers and support multiple deployment types (private cloud, public cloud, hybrid cloud). The information handling system creates target applications from the industry standard patterns that, in one embodiment, retain or increase the service quality of the service in various nonfunctional areas (performance, availability, etc.). In turn, the information handling system provisions the target applications to one or multiple different cloud providers and transforms the source content utilized by the source application to target content that is available for the target applications.

Figure 3:
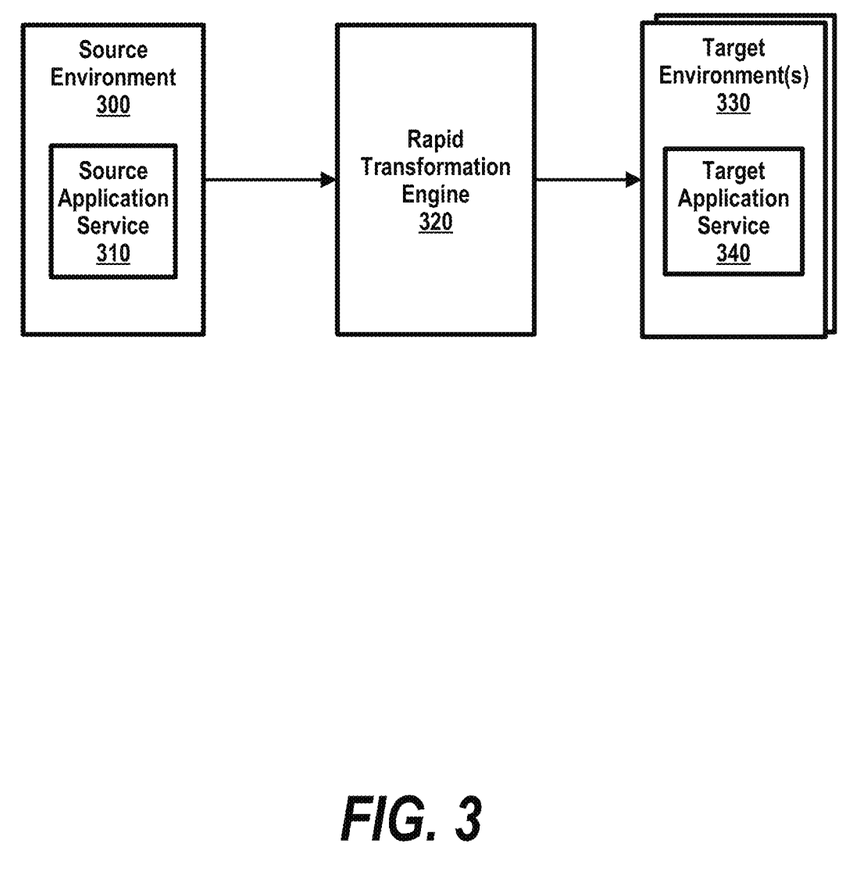
FIG. 3 is a high-level diagram depicting an example of a rapid transformation engine that migrates a source application service from a source environment to a target environment using industry standard patterns.

FIG. 3 is a high-level diagram depicting an example of a rapid transformation engine that migrates a source application service from a source environment to a target environment using industry standard patterns. As discussed in detail below, source environment 300 may include a discovery component (e.g., affinity discovery network component 410 shown in FIG. 4) that scans source environment 300 to identify interdependencies between applications, middleware, servers, and network components across a full scanned environment for all systems. The discovery component then generates discovery results that include application landscapes and affinities of source applications executing in the scanned environment. For example, the discovery results may include application-centric data models based on topologies and relationships between hardware components and software components utilized by source application service 310.

Figure 4:
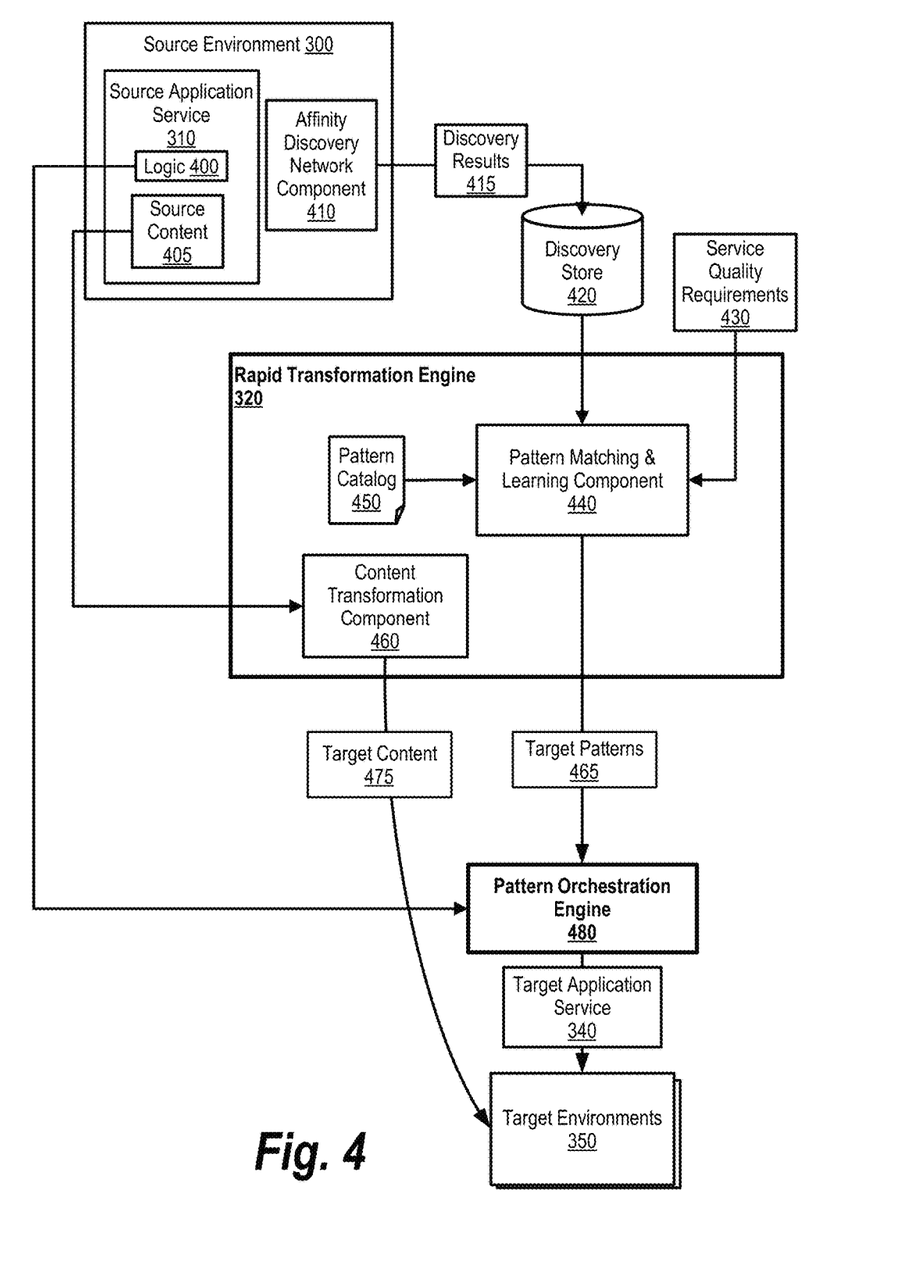
FIG. 4 is a detail diagram depicting an example of a rapid transformation engine that migrates a source application service and corresponding content to a target environment using industry standard patterns.

From the discovery results, rapid transformation engine 320 identifies industry standard patterns corresponding to the discovery results that also fulfill requested service levels outlined in a client's service quality requirements (e.g., service quality requirements 430 shown in FIG. 4). The industry standard patterns may be a composite of patterns supplied by public, private, and/or hybrid cloud environments (see FIGS. 4, 5, 8, and corresponding text for further details).

Once rapid transformation engine 320 identifies the target patterns, rapid transformation engine 320 integrates the target patterns with source application logic from source application service 310 to create target application service 340. In one embodiment, and orchestration engine, such as pattern orchestration engine 480 shown in FIG. 4, creates target application service 340 from the source application logic and identified target patterns. Target application service 340 is then provisioned to target environments 350, which may be one cloud environment or multiple types of cloud environments.

Next, rapid transformation engine 320 transforms source content utilized by source application service 310 to target content (see FIG. 4 and corresponding text for further details). The target content is then deployed to target environment 330 and target application service 340 is configured to utilize the target content. At this point, target application service 340 is fully functional and ready to support a client's requirements.

FIG. 4 is a diagram depicting an example of a rapid transformation engine that migrates a source application service to a target environment using industry standard patterns. Affinity discovery network component 410 scans source environment 300 to identify interdependencies between applications, middleware, servers, and network components across source environment 300. Affinity discovery network component 410 then stores discovery results 415 in discovery store 420. In one embodiment, the discovery results are stored in an application-centric data model such as the example shown in FIG. 7.

Rapid transformation engine 320 retrieves discovery results 415 from discovery store 415 and retrieves service quality requirements 430 from, for example, a client configuration storage area. Service quality requirements 430 may be generated by a system developer or a client corresponding to source application service 310.

Figure 7:
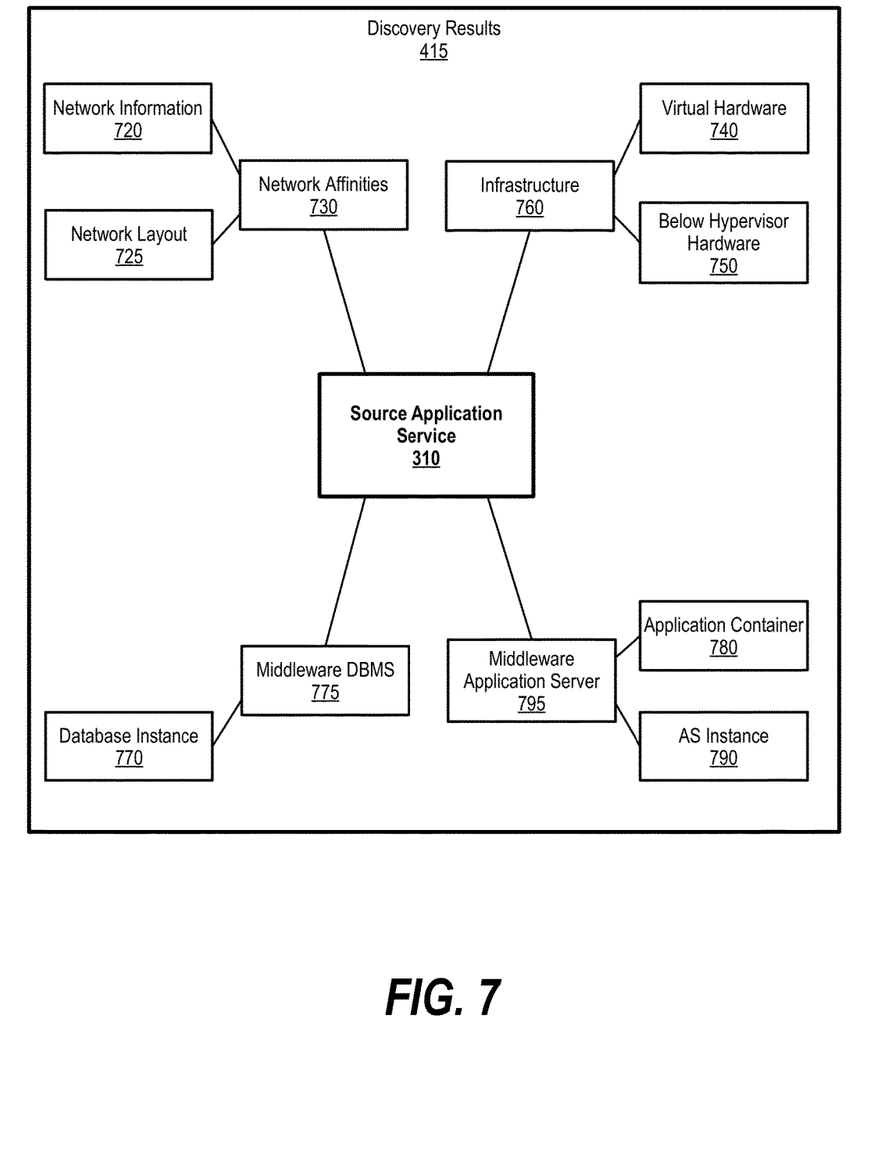
FIG. 7 is a diagram depicting a graphical example of business application-centric discovery results generated by an affinity discovery network component.

Rapid transformation engine 320 uses pattern matching and learning component 440 to evaluate discovery results 415. In one embodiment, pattern matching and learning component 440 partitions the application-centric data models across multiple dimensions (e.g., infrastructure, middleware DBMS, middleware application server and network affinities, etc.). Then, pattern matching and learning component 440 uses the partitioning results to select best fitting pattern(s) from pattern catalog 450 according to service quality requirements 430 of the particular dimensions. Referring to FIG. 7, pattern matching and learning component 440 maps the set of discovery results "AppType"DB2" to target pattern "Flavor:DB2." Rapid transformation engine 320, in one embodiment, then provides the target patterns 465 to pattern orchestration engine 480.

Pattern orchestration engine 480 integrates target patterns 465 with source application logic 400 from source application service 310 to create target application service 340. Source application logic 400, in one embodiment, describes executable components that implement source application service 310, such as an enterprise archive (EAR) file format to serve as a container for executable application modules. Pattern orchestration engine 480 then provisions target application service 340 to target environments 350.

Rapid transformation engine 320's content transformation component 460 retrieves source content 405 (e.g., data utilized by source application service 310) from source application service 310 and transforms source content 405 into target content 475 specific to target environments 350 and target application service 340 using, for example, vendor supplied conversion tools. Rapid transformation engine 320 deploys target content 475 to target environments 350 and configures target application service 340 to utilize target content 475 in target environments 350.

Figure 5:
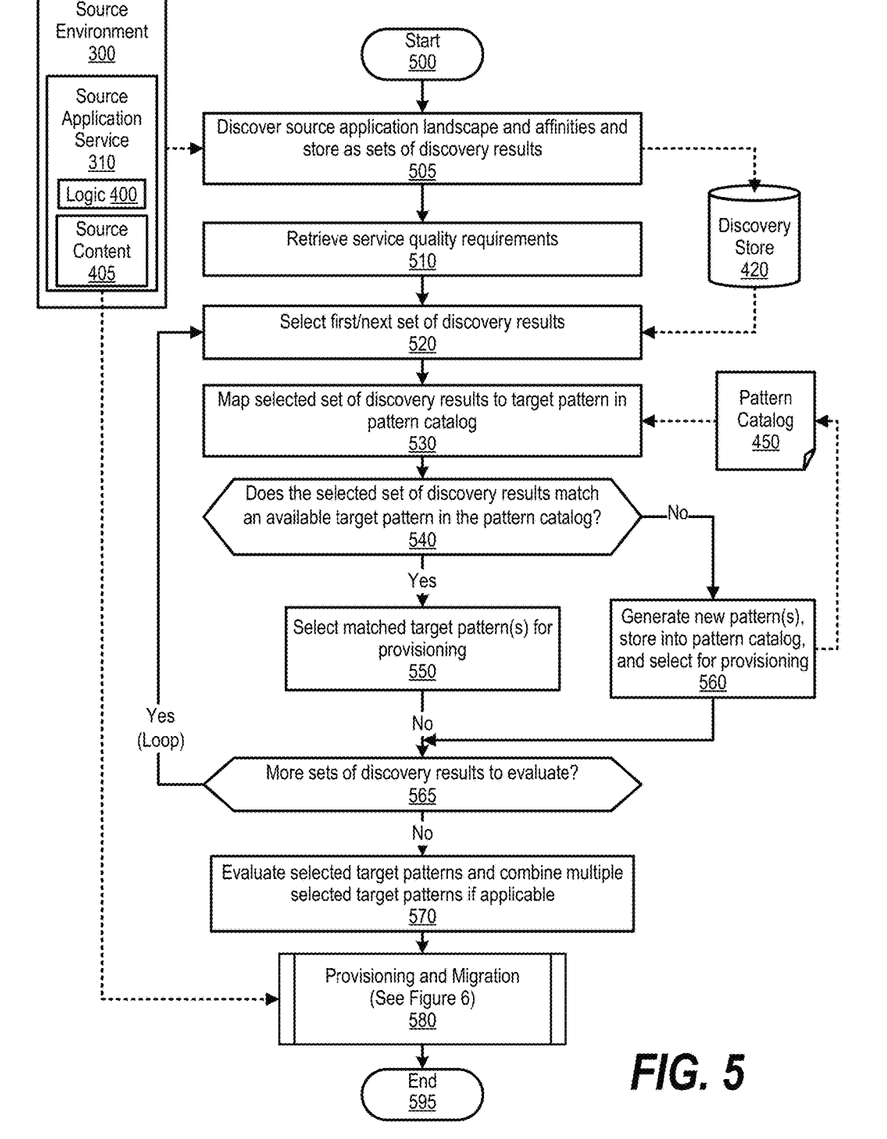
FIG. 5 is a flowchart depicting an example of steps taken to migrate source application services and source content to a target cloud environment.

FIG. 5 is a flowchart depicting an example of steps taken to migrate source application services and source content to a target cloud environment. FIG. 5 processing commences at 500 whereupon, at step 505, the process discovers source environment 300's application landscapes and affinities, which includes source application service 310. In one embodiment, the discovery process identifies several physical components and virtual components utilized by source application services 310 within source environment 300 (see FIG. 7 and corresponding text for further details).

The process stores the discovery results in discovery store 420. In one embodiment, the discovery results are in "sets" of discovery results adhering to a business application-centric data model. In this embodiment, each of the sets of discovery results may correspond to different applications executing on source environment 300. At step 510, the process retrieves service quality requirements that indicate specific client needs, such as a specific level of service at particular dimensions (infrastructure, middleware, etc.). As discussed below, the process uses the service quality requirements to map the discovery results to applicable target patterns.

At step 520, the process selects a first set of discovery results from discovery store 420 and, at step 530, the process maps the selected set of discovery results against industry standard target patterns included in pattern catalog 460 while considering the service quality requirements. In one embodiment, the process evaluates the set of discovery results against certain type of industry standard patterns from certain vendors based on the service quality requirements and/or target environments. For example, if the service quality requirements indicate a service level that company XYZ's cloud service provides, then processing may evaluate just the target patterns corresponding to company XYZ's cloud environment.

The process determines as to whether the selected set of discovery results maps to one of the target patterns (decision 540). If the selected set of discovery results maps to an available target pattern in the pattern catalog, then decision 540 branches to the 'yes' branch whereupon, at step 550, the process selects the matched target pattern(s) for provisioning.

On the other hand, if the discovered pattern does not match an available target pattern in the pattern catalog, then decision 540 branches to the 'no' branch. At step 560, the process generates new pattern(s) to store into pattern catalog 460 for subsequent use, and selects the newly generated pattern(s) for provisioning. In one embodiment, the process receives input from migration experts to create an altogether new pattern or modify an existing pattern to support the set of discovery results.

A determination is made as to whether there are more sets of discovery results (e.g., more source applications) to evaluate against the target patterns (decision 565). If there are more sets of discovery results to evaluate, decision 565 branches to the "Yes" branch, which loops back to select and evaluate the next set of discovery results. This looping continues until there are no more sets of discovery results to evaluate, at which point decision 565 branches to the "No" branch.

At step 570, the process evaluates the selected target patterns and combines various patterns if applicable. For example, the process may combine an application server deployment pattern with a database server deployment pattern to form a complete application service pattern. At pre-defined process block 580, the process then integrates source application logic 400 with the selected target patterns to create a target application service and provision the target application service to a target environment. The process then transforms source content 405 to target content and deploys the target content to the target environment for use by the target application (see FIG. 6 and corresponding text for further details). FIG. 5 processing thereafter ends at 595.

Figure 6:
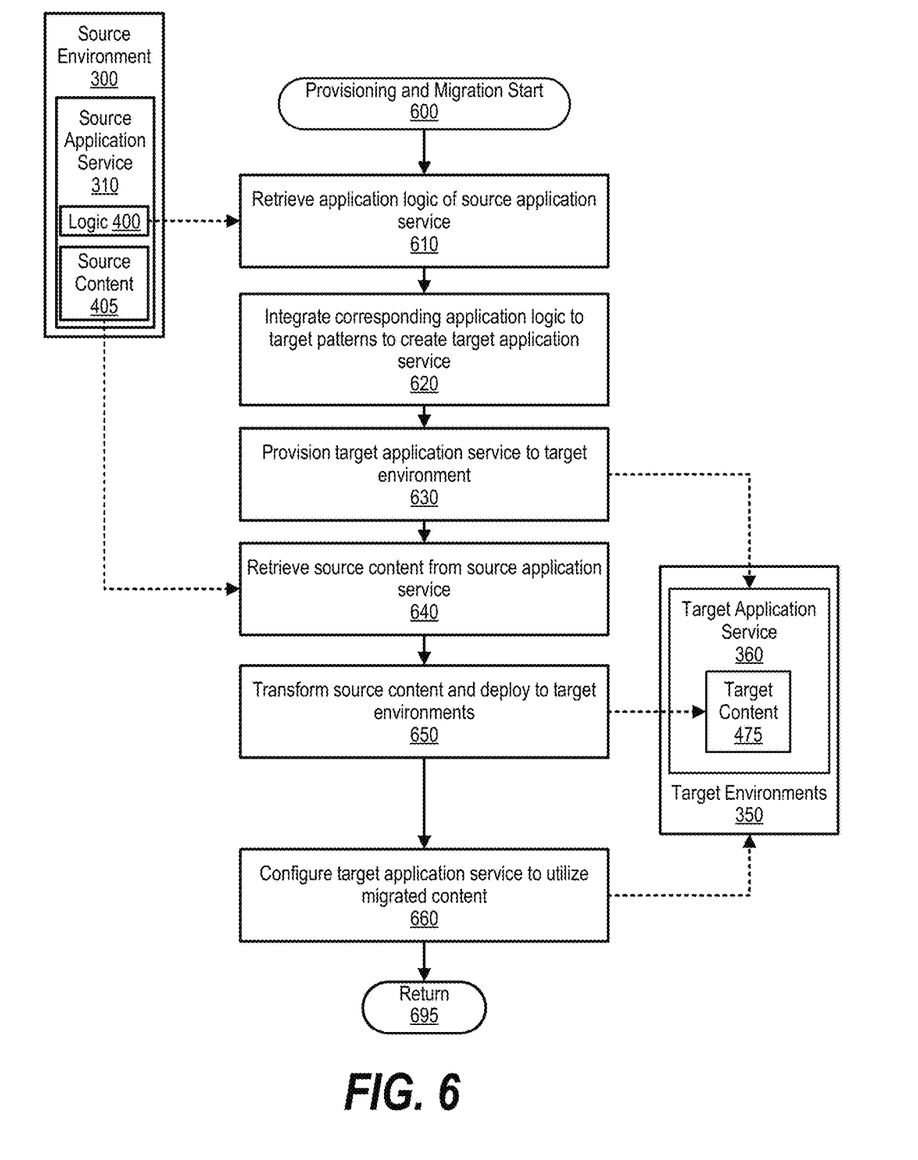
FIG. 6 is a flowchart depicting an example of steps taken to create a target application service from target patterns and provision the target application service to target environments.

FIG. 6 is a flowchart depicting an example of steps taken to create a target application service from target patterns and provision the target application service to target environments. Processing commences at 600 whereupon, at step 610, the process retrieves application logic 400 from source application service 310. At step 620, the process integrates application logic 400 with the target patterns selected in FIG. 5 to create target application service 360. The target patterns may be viewed as "blueprints" that include declarative descriptions of source application services 310.

The process, at step 630, provisions target application service 360 to target environment 350. In one embodiment, target environment 350 may include multiple types of cloud environments. In this embodiment, the process uses the various cloud environments' API interfaces and follows a certain provisioning sequence to ensure that component dependencies are met. For example, the process may first provision a database before provisioning an application server because the application server is configured to connect to the database.

At step 640, the process retrieves source content 405 from source application service 310 and, at step 650, the process transforms source content 405 into a format suitable for target application service 360 and target environment 350. In one embodiment, the process may utilize content transformation components supplied by target environment vendors. The process then deploys target content 475 into target environment 350. At step 660, the process configures target application service 360 to utilize target content 475. FIG. 6 processing thereafter ends at 695.

FIG. 7 is a diagram depicting a graphical example of business application-centric discovery results generated by affinity discovery network component 410. Affinity discovery network component 410, shown in FIG. 4, scans source environment 300 to identify interdependencies between applications, middleware, servers, and network components across a full scanned source environment 300 for all systems. Affinity discovery network component 410 then generates discovery results 415 that include application landscapes and affinities of source applications executing in the scanned environment. As those skilled in the art can appreciate, discovery results 415 is an example of discovery results that may be generated during a discovery scan and may include more, less, and/or different components than that shown in FIG. 7.

Discovery results 415 shows source application service 310 and relationships between network affinities 730, network information 720, and network layout 725. Discovery results 415 also shows hardware components utilized by source application service 310 such as infrastructure 760, virtual hardware 740, and below hypervisor hardware 750.

In addition, discovery results 415 shows middleware components utilized by source application service 310, such as middleware application server 795, application container 780, and Application Server (AS) instance 790. Discovery results 415 also shows source content utilized by source application service 310, which is database instance 770 (e.g., source content 405) via middleware DBMS 775.

Figure 8:
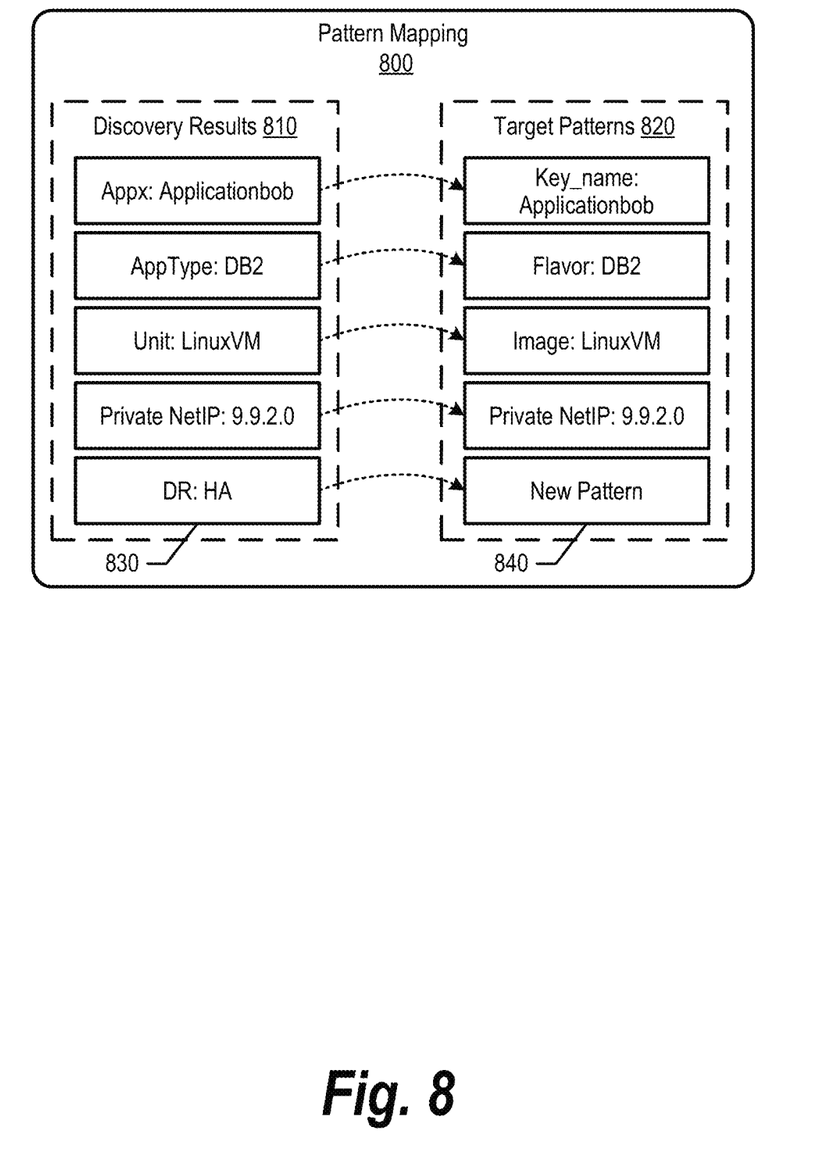
FIG. 8 is a diagram depicting an example of discovery results mapped to industry standard patterns.

FIG. 8 is a diagram depicting an example of discovery results mapped to industry standard patterns. Rapid transformation engine 320 evaluates discovery results 810 and selects industry standard patterns corresponding to the discovery results that also fulfill requested service levels outlined in service quality requirements 430. In one embodiment, the selected patterns may be a composite of patterns supplied by either public, private, or hybrid cloud environments.

Pattern mapping diagram 800 shows that rapid transformation engine 320 maps each application in discovery results 810 to an industry standard pattern except application 830. As such, rapid transformation engine 320 creates a new pattern 840 that describes application 830's components, configurations, relationships, etc. (see step 560 in FIG. 5 and corresponding text for further details). In turn, rapid transformation engine 320 includes new pattern 830 into target patterns 820, which rapid transformation engine 320 sends to pattern orchestration engine 480 for further processing as discussed herein.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   receiving a set of discovery results corresponding to a source application service executing in a source environment, wherein the set of discovery results comprise one or more affinities between the source application service and one or more first components executing in the source environment;
   matching, by the processor, the set of discovery results to a set of patterns based, at least in part, upon the one or more affinities between the source application service and the one or more first components;
   creating, by the processor, a target application service based, at least in part, upon integrating the matched set of patterns with source application logic that describes one or more second components implemented in the source application service; and
   provisioning, by the processor, the target application service to one or more target environments.

2. The method of claim 1 further comprising:
   transforming source content utilized by the source application to target content;
   migrating the target content to the one or more target environments; and configuring the target application to utilize the target content.

3. The method of claim 2 wherein the source environment is a non-cloud environment and the one or more target environments are cloud environments.

4. The method of claim 1 wherein the set of discovery results is an application-centric data model, and wherein the mapping further comprises:
   partitioning the application-centric data model across a plurality of dimensions, resulting in a plurality of partitions;
   for each of the plurality of dimensions:
      selecting a corresponding one of the plurality of partitions; and
      comparing the selected partition against a plurality of patterns based on one or more service quality requirements of the corresponding dimension, wherein the matched set of patterns are included in the plurality of patterns; and
   performing the matching based upon the comparing.

5. The method of claim 4 wherein at least one of the plurality of dimensions is selected from the group consisting of an infrastructure dimension, a middleware database dimension, a middleware application server dimension, and a network affinities dimension.

6. The method of claim 1 further comprising:
   comparing the set of discovery results against a plurality of patterns, wherein the matched set of patterns are included in the plurality of patterns;
   in response to determining that the set of discovery results do not match at least one of the plurality of patterns, creating a new pattern that describes the set of discovery results; and
   utilizing the new pattern during the creating of the target application service.

7. An information handling system comprising:
   one or more processors;
   a memory coupled to at least one of the processors;
   a set of computer program instructions stored in the memory and executed by at least one of the processors in order to perform actions of:
      receiving a set of discovery results corresponding to a source application service executing in a source environment, wherein the set of discovery results comprise one or more affinities between the source application service and one or more first components executing in the source environment;
      matching the set of discovery results to a set of patterns based, at least in part, upon the one or more affinities between the source application service and the one or more first components;
      creating a target application service based, at least in part, upon integrating the matched set of patterns with source application logic that describes one or more second components implemented in the source application service; and
      provisioning the target application service to one or more target environments.

8. The information handling system of claim 7 wherein the processors perform additional actions comprising:
   transforming source content utilized by the source application to target content;
   migrating the target content to the one or more target environments; and
   configuring the target application to utilize the target content.

9. The information handling system of claim 8 the source environment is a non-cloud environment and the one or more target environments are cloud environments.

10. The information handling system of claim 7 wherein the set of discovery results is an application-centric data model, and wherein the processors perform additional actions comprising:
    partitioning the application-centric data model across a plurality of dimensions, resulting in a plurality of partitions;
    for each of the plurality of dimensions:
       selecting a corresponding one of the plurality of partitions; and
       comparing the selected partition against a plurality of patterns based on one or more service quality requirements of the corresponding dimension, wherein the matched set of patterns are included in the plurality of patterns; and
    performing the matching based upon the comparing.

11. The information handling system of claim 10 wherein at least one of the plurality of dimensions is selected from the group consisting of an infrastructure dimension, a middleware database dimension, a middleware application server dimension, and a network affinities dimension.

12. The information handling system of claim 7 wherein the processors perform additional actions comprising:

comparing the set of discovery results against a plurality of patterns, wherein the matched set of patterns are included in the plurality of patterns;

in response to determining that the set of discovery results do not match at least one of the plurality of patterns, creating a new pattern that describes the set of discovery results; and including the new pattern in the one or more target patterns and utilizing the new pattern during the creating of the target application.

13. A computer program product stored in a computer readable storage medium, comprising computer program code that, when executed by an information handling system, causes the information handling system to perform actions comprising:

receiving a set of discovery results corresponding to a source application service executing in a source environment, wherein the set of discovery results comprise one or more affinities between the source application service and one or more first components executing in the source environment;

matching the set of discovery results to a set of patterns based, at least in part, upon the one or more affinities between the source application service and the one or more first components;

creating a target application service based, at least in part, upon integrating the matched set of patterns with source application logic that describes one or more second components implemented in the source application service; and provisioning the target application service to one or more target environments.

14. The computer program product of claim 13 wherein the information handling system performs further actions comprising:

transforming source content utilized by the source application to target content;

migrating the target content to the one or more target environments; and configuring the target application to utilize the target content.

15. The computer program product of claim 13 wherein the set of discovery results is an application-centric data model, and wherein the information handling system performs further actions comprising:

partitioning the application-centric data model across a plurality of dimensions, resulting in a plurality of partitions;

for each of the plurality of dimensions:
selecting a corresponding one of the plurality of partitions; and
comparing the selected partition against a plurality of patterns based on one or more service quality requirements of the corresponding dimension, wherein the matched set of patterns are included in the plurality of patterns; and performing the matching based upon the comparing.

16. The computer program product of claim 15 wherein at least one of the plurality of dimensions is selected from the group consisting of an infrastructure dimension, a middleware database dimension, a middleware application server dimension, and a network affinities dimension.

17. The computer program product of claim 13 wherein the information handling system performs further actions comprising:

comparing the set of discovery results against a plurality of patterns, wherein the matched set of patterns are included in the plurality of patterns;

in response to determining that the set of discovery results do not match at least one of the plurality of patterns, creating a new pattern that describes the set of discovery results; and including the new pattern in the one or more target patterns and utilizing the new pattern during the creating of the target application.

* * * * *